(12) United States Patent
Ogino (10) Patent No.: US 12,187,135 B2
(45) Date of Patent: Jan. 7, 2025

(54) DRIVING FORCE CONTROL METHOD AND DRIVING FORCE CONTROL DEVICE

(71) Applicant: Nissan Motor Co., Ltd., Yokohama (JP)

(72) Inventor: Takashi Ogino, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/688,988

(22) PCT Filed: Sep. 6, 2021

(86) PCT No.: PCT/JP2021/032723
§ 371 (c)(1),
(2) Date: Mar. 4, 2024

(87) PCT Pub. No.: WO2023/032221
PCT Pub. Date: Mar. 9, 2023

(65) Prior Publication Data
US 2024/0367526 A1    Nov. 7, 2024

(51) Int. Cl.
*B60L 15/20*    (2006.01)
*B60K 1/02*    (2006.01)

(52) U.S. Cl.
CPC ............ *B60L 15/2009* (2013.01); *B60K 1/02* (2013.01); *B60L 2240/14* (2013.01); *B60L 2240/64* (2013.01)

(58) Field of Classification Search
CPC .................................................. B60L 15/2009
See application file for complete search history.

(56) References Cited

U.S. PATENT DOCUMENTS

| | | | |
|---|---|---|---|
| 9,120,469 B2 * | 9/2015 | Katsuyama | .......... B60K 17/356 |
| 9,457,804 B2 * | 10/2016 | Katsuyama | .......... B60W 10/22 |
| 11,731,655 B2 * | 8/2023 | Di Cairano | .......... B60W 10/08 |
| | | | 701/70 |
| 2014/0309902 A1 | 10/2014 | Katsuyama | |
| 2015/0100205 A1 | 4/2015 | Katsuyama | |

FOREIGN PATENT DOCUMENTS

| | | |
|---|---|---|
| JP | H11115745 A | 4/1999 |
| JP | 2007118898 A | 5/2007 |
| JP | 2013154800 A | 8/2013 |
| JP | 201467299 A | 4/2014 |
| JP | 2015071362 A | 4/2015 |
| JP | 2018161952 A | 10/2018 |
| JP | 2021011133 A | 2/2021 |
| WO | 2013069126 A1 | 5/2013 |

* cited by examiner

*Primary Examiner* — Michael A Berns
(74) *Attorney, Agent, or Firm* — Young Basile Hanlon & MacFarlane, P.C.

(57) ABSTRACT

A driving force control method controls front wheel driving force and rear wheel driving force by a front wheel motor connected to a front wheel of a vehicle and a rear wheel motor connected to a rear wheel, respectively. The driving force control method includes: executing a cooperative process of lifting up or lifting down a vehicle body by cooperation of adjustment of at least one of the front wheel driving force and the rear wheel driving force and application of friction braking force to at least one of the front wheel and the rear wheel.

6 Claims, 6 Drawing Sheets

FIG. 6 (a) $\theta_{pi}$ — NOSE UP DIRECTION

FIG. 6 (b) $\omega_{pi}$ — NOSE UP DIRECTION

FIG. 6 (c) $a_G$ — UPWARD DIRECTION

FIG. 6 (d) $S_{su}$ — COMPRESSION DIRECTION

FRONT — — —
REAR - - - - -

DRIVING FORCE CONTROL METHOD AND DRIVING FORCE CONTROL DEVICE

TECHNICAL FIELD

The present invention relates to a driving force control method and a driving force control device.

BACKGROUND ART

In JP 2007-118898 A, there has been proposed a braking and driving force control device that detects a pitch rate (pitch angular velocity) when an in-wheel motor type vehicle passes through a step of a road surface to apply different braking and driving force to front and rear wheels so as to reduce the detected pitch rate (displacement in a pitch direction) when an effect of suspension is not sufficiently achieved in the in-wheel motor type vehicle.

SUMMARY OF INVENTION

Depending on a traveling scene of the vehicle, there may be a case in which vehicle body displacement (heave vibration) in a vertical direction is mainly large, and control of reducing this is desired. However, in the above-described control of reducing the displacement in the pitch direction by applying the different braking and driving force to the front and rear wheels, there is a problem that an effect of reducing the displacement in the vertical direction is limited.

An object of the present invention is to provide a driving force control method and a driving force control device that can further improve an effect of reducing vertical displacement of a vehicle.

According to an aspect of the invention, provided is that a driving force control method for controlling front wheel driving force and rear wheel driving force by a front wheel motor connected to a front wheel of a vehicle and a rear wheel motor connected to a rear wheel, respectively. The driving force control method includes executing a cooperative process of lifting up or lifting down a vehicle body by cooperation of adjustment of at least one of the front wheel driving force and the rear wheel driving force and application of friction braking force to at least one of the front wheel and the rear wheel.

DESCRIPTION OF EMBODIMENTS

Hereinafter, embodiments of the present invention will be described in detail with reference to the drawings.

Figure 1:
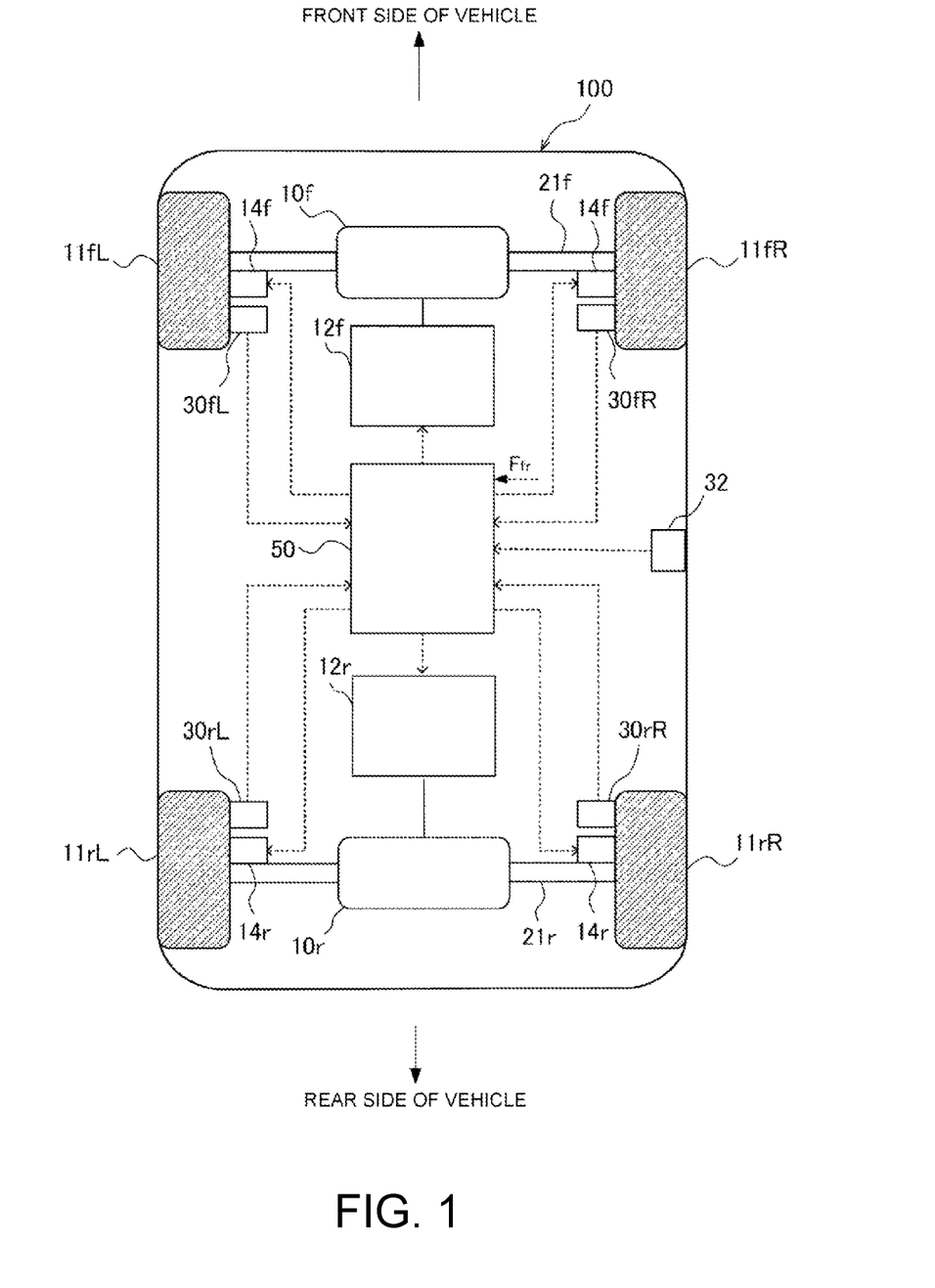
FIG. 1 is a diagram illustrating a configuration of a vehicle in which a driving force control method according to an embodiment of the present invention is executed.

FIG. 1 is a diagram illustrating a configuration of a vehicle 100 in which a driving force control method according to the present embodiment is executed. As the vehicle 100 according to the present embodiment, an electric vehicle, a hybrid vehicle, or the like, which includes a drive motor 10 serving as a driving source and can travel by driving force of the drive motor 10, is assumed.

The drive motor 10 includes a front wheel motor $10f$ provided at a front position (front wheel side) of the vehicle 100 to drive front wheels $11f$, and a rear wheel motor $10r$ provided at a rear position (rear wheel side) to drive rear wheels $11r$.

The front wheel motor $10f$ is implemented by a three-phase AC motor. During power running, the front wheel motor $10f$ is supplied with electric power from an in-vehicle battery (not shown) to generate driving force. The driving force generated by the front wheel motor $10f$ is transmitted to the front wheels $11f$ via a front wheel transmission $16f$ and a front wheel drive shaft $21f$. On the other hand, during regeneration, the front wheel motor $10f$ converts regenerative braking force of the front wheels $11f$ into AC power and supplies the AC power to the in-vehicle battery.

On the other hand, the rear wheel motor $10r$ is implemented by a three-phase AC motor. During power running, the rear wheel motor $10r$ is supplied with electric power from the in-vehicle battery to generate driving force. The driving force generated by the rear wheel motor $10r$ is transmitted to the rear wheels $11r$ via a rear wheel transmission $16r$ and a rear wheel drive shaft $21r$. During regeneration, the rear wheel motor $10r$ converts regenerative braking force of the rear wheels $11r$ into AC power and supplies the AC power to the in-vehicle battery.

An inverter 12 includes a front wheel inverter $12f$ that adjusts the electric power (positive in the power running and negative in the regeneration) supplied to the front wheel motor $10f$, and a rear wheel inverter $12r$ that adjusts the electric power (positive in the power running and negative in the regeneration) supplied to the rear wheel motor $10r$.

The front wheel inverter $12f$ adjusts the electric power supplied to the front wheel motor $10f$ such that positive or negative driving force (hereinafter, also referred to as "front wheel driving force $F_f$") determined for total driving force (hereinafter, also referred to as "total requested driving force $F_{fr}$") requested for the vehicle 100 is achieved. On the other hand, the rear wheel inverter $12r$ adjusts the electric power supplied to the rear wheel motor $10r$ such that positive or negative driving force (hereinafter, also referred to as "rear wheel driving force $F_r$") determined for the total requested driving force $F_{fr}$ is achieved.

In particular, the front wheel driving force $F_f$ and the rear wheel driving force $F_r$ in the present embodiment are determined such that a sum thereof matches the total requested driving force $F_{fr}$. The total requested driving force $F_{fr}$ is determined based on, for example, an operation amount (accelerator opening) for an accelerator pedal mounted on the vehicle 100, or a command from a prescribed autonomous driving system (autonomous driving control device) such as an advanced driver assistance systems (ADAS) or autonomous driving (AD).

A brake actuator 14 is constituted by known mechanical brakes operated by hydraulic pressure or the like, and includes front wheel friction brakes $14f$ that apply friction braking force (hereinafter also referred to as "front wheel braking force $B_f$") to the front wheel $11f$, and rear wheel friction brakes $14r$ that apply friction braking force (hereinafter also referred to as "rear wheel braking force $B_r$") to the rear wheel $11r$.

Further, the vehicle 100 further includes a controller 50 serving as a driving force control device that controls the front wheel driving force $F_f$, the rear wheel driving force $F_r$, the front wheel braking force $B_f$, and the rear wheel braking force $B_r$.

The controller 50 is implemented by a computer including a central processing unit (CPU), a read-only memory (ROM), a random access memory (RAM), and an input/output interface (I/O interface), and is programmed so as to execute each processing in vehicle control to be described below. In particular, a function of the controller 50 can be achieved by any in-vehicle computer such as a vehicle control module (VCM), a vehicle motion controller (VMC), and a motor controller, and/or a computer provided outside the vehicle 100. The controller 50 may be implemented by one piece of computer hardware, or may be implemented by distributing various processes by a plurality of pieces of computer hardware.

The controller 50 controls the front wheel driving force $F_f$, the rear wheel driving force $F_r$, the front wheel braking force $B_f$, and the rear wheel braking force $B_r$ by using the total requested driving force $F_{fr}$, detection values of vertical acceleration sensors 30$f$L, 30$f$R on the front wheel side, detection values of vertical acceleration sensors 30$r$L, 30$r$R on the rear wheel side, a suspension stroke amount $S_{su}$ detected by a sensor (not shown), and the like as input information. More specifically, the controller 50 issues a command to the front wheel inverter 12$f$, the rear wheel inverter 12$r$, the front wheel friction brake 14$f$, and the rear wheel friction brake 14$r$ so as to achieve desired front wheel driving force $F_f$, rear wheel driving force $F_r$, front wheel braking force $B_f$, and rear wheel braking force $B_r$.

In particular, in the present embodiment, the controller 50 executes any one of basic drive control, a cooperative process, and a non-cooperative process as control that defines driving force distribution during forward traveling (particularly, during acceleration) of the vehicle 100.

The controller 50 executes the basic drive control during normal traveling (in the present embodiment, in particular, a scene other than traveling on an undulating road to be described later). In the basic drive control, the controller 50 sets the front wheel driving force $F_f$ and the rear wheel driving force $F_r$ to prescribed basic front wheel driving force and prescribed basic rear wheel driving force, respectively.

Here, the basic front wheel driving force and the basic rear wheel driving force are values determined by experiments, simulations, or the like so that vehicle characteristics (in particular, power consumption performance) of the vehicle 100 take desired characteristics according to a traveling scene. Specific values of the basic front wheel driving force and the basic rear wheel driving force may be appropriately changed in accordance with a specification of the vehicle 100 and the traveling scene. For example, when the vehicle 100 travels straight on a flat paved road at a constant speed, a distribution ratio of the basic front wheel driving force and the basic rear wheel driving force to the total requested driving force $F_{fr}$ can be set to 50:50.

On the other hand, when controller 50 detects a scene in which the vehicle 100 travels on a prescribed undulating road based on various pieces of input information, the controller 50 executes any one of the cooperative process and the non-cooperative process according to a size (amplitude) of an unevenness of the undulating road. In the present embodiment, the undulating road means a traveling road on which an unevenness is present over a certain distance in a traveling direction of the vehicle 100. In the following, in particular, a portion of the undulating road protruding from a flat surface is referred to as a "mountain", and a portion thereof recessed from the flat surface is referred to as a "valley".

In the cooperative process, the controller 50 executes either a first control mode or a second control mode in response to a request to lift up a vehicle body or a request to lift down the vehicle body.

In the first control mode, the controller 50 sets the front wheel braking force $B_f$ to a positive value, sets the front wheel driving force $F_f$ to a negative value, and sets the rear wheel driving force Fr to a positive value. That is, the controller 50 causes the front wheel motor 10$f$ to execute regeneration (causes the front wheels 11$f$ to execute regenerative braking), causes the rear wheel motor 10$r$ to execute power running (causes the rear wheels 11$r$ to execute power driving), and then applies the friction braking force to the front wheels 11$f$. In the second control mode, the controller 50 sets the front wheel driving force $F_f$ to a positive value, sets the rear wheel driving force $F_r$ to a negative value, and sets the rear wheel braking force $B_r$ to a positive value. That is, the controller 50 causes the front wheel motor 10$f$ to execute power running (causes the front wheels 11$f$ to execute power driving), causes the rear wheel motor 10$r$ to execute regeneration (causes the rear wheels 11$r$ to execute regenerative braking), and then applies the friction braking force to the rear wheels 11$r$.

On the other hand, in the non-cooperative process, the controller 50 executes either a third control mode or a fourth control mode in response to a request to lift up the vehicle body or a request to lift down the vehicle body.

In the third control mode, the controller 50 sets the front wheel driving force $F_f$ to a negative value and sets the rear wheel driving force $F_r$ to a positive value without applying the front wheel braking force $B_f$. Further, in the fourth control mode, the controller 50 sets the front wheel driving force $F_f$ to a positive value and sets the rear wheel driving force $F_r$ to a negative value without applying the rear wheel braking force $B_r$.

A relationship between adjustment of the front wheel driving force $F_f$, the rear wheel driving force $F_r$, the front wheel braking force $B_f$, and the rear wheel braking force $B_r$ and reduction of vertical displacement of the vehicle body in the cooperative process and the non-cooperative process will be described more specifically.

Figure 2:
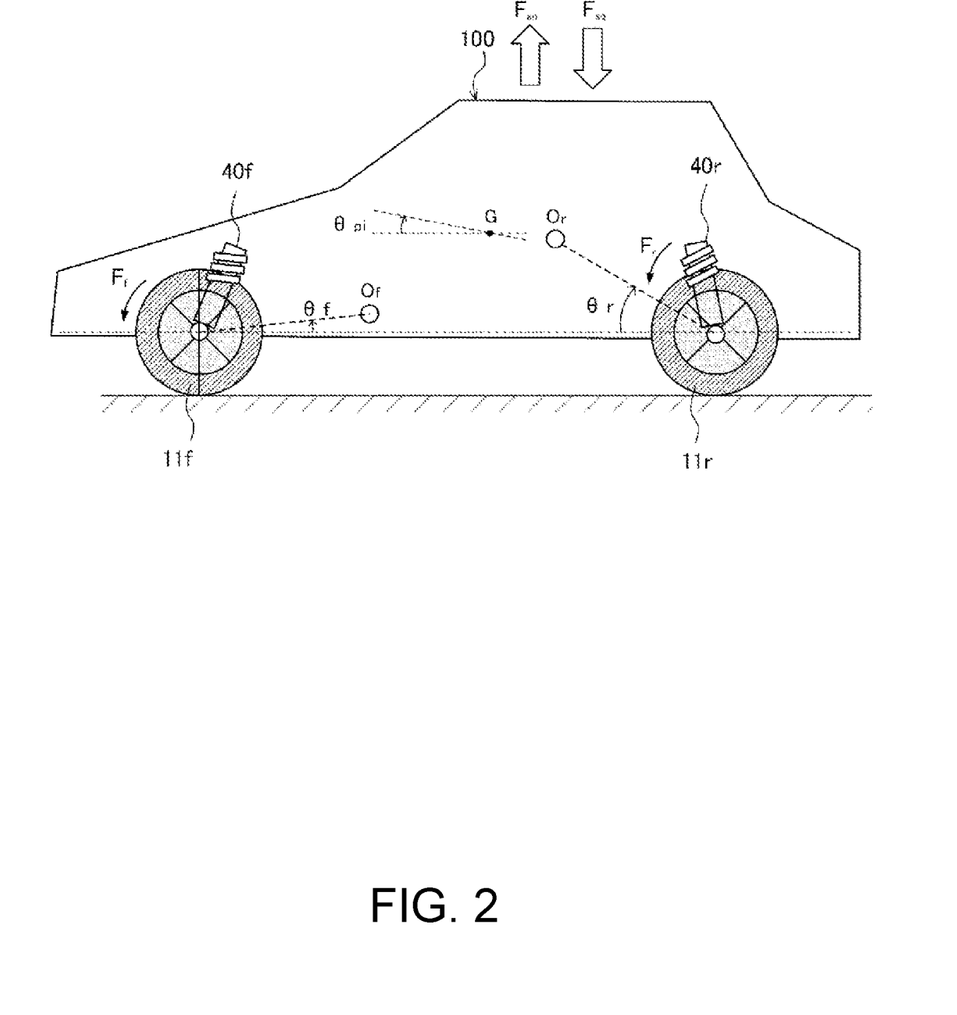
FIG. 2 is a diagram showing a schematic structure of a chassis system of the vehicle.

FIG. 2 is a diagram illustrating a schematic structure (particularly, an outline of a suspension geometry) of a chassis system of the vehicle 100. In the figure, "$O_f$" represents a virtual rotation center (instantaneous rotation center) in a pitch direction of a vehicle body front portion, and "$O_r$" represents a virtual rotation center (instantaneous rotation center) in the pitch direction of a vehicle body rear portion.

When the vehicle 100 is traveling forward, when the regenerative braking force (force in a direction opposite to the traveling direction) is applied to the front wheels 11$f$ and power driving force (force in the same direction as the traveling direction) is applied to the rear wheels 11$r$, anti-squat force $F_a$ (force for lifting the vehicle body) acts on the vehicle body. On the other hand, when power driving force is applied to the front wheels 11$f$ and regenerative braking force is applied to the rear wheels 11$r$, squat force $F_{sq}$ (force for causing the vehicle body to sink) acts on the vehicle body.

Accordingly, theoretically, in the scene in which the vehicle 100 travels on the undulating road or the like, by performing pitch adjustment (that is, the above-described non-cooperative process) by adjusting the driving force distribution of the front wheels 11*f* and the rear wheels 11*r*, it is possible to reduce the vertical displacement (heave vibration) of the vehicle body by appropriately lifting up or lifting down the vehicle body.

On the other hand, a magnitude of the anti-squat force $F_{an}$ or the squat force $F_{sq}$ obtained by the non-cooperative process depends on a magnitude of an anti-squat angle θ (front anti-squat angle $θ_f$ and rear anti-squat angle $θ_r$) of a suspension 40 (front suspension 40*f* and rear suspension 40*r*) of the vehicle 100.

More specifically, the front wheel driving force $F_f$ generated by the front wheel motor 10*f* and the rear wheel driving force $F_r$ generated by the rear wheel motor 10*r* are transmitted to the front wheels 11*f* and the rear wheels 11*r*, respectively, with the front wheel drive shaft 21 and the rear wheel drive shaft 21*r* as working points.

Therefore, the anti-squat angles $θ_f$ and $θ_r$, which define a vertical component of pitching force generated by the adjustment of the driving force distribution (that is, the magnitude of the anti-squat force $F_{an}$ or the squat force $F_{sq}$), are respectively determined as angles formed by a horizontal line and straight lines respectively connecting the virtual rotation centers $O_f$ and $O_r$ determined by structures of the suspensions 40*f*, 40*r* and the working points.

Therefore, in a case in which the anti-squat angles $θ_f$ and $θ_r$ cannot be increased (in a case in which the virtual rotation centers $O_f$ and $O_r$ are located at relatively low positions) due to the structures of the suspensions 40*f* and 40*r*, a range of the anti-squat force $F_{an}$ or the squat force $F_{sq}$ obtained by adjusting the driving force distribution is limited.

In particular, as in the vehicle 100 of the present embodiment shown in FIG. 2, in a case in which a suspension structure in which the front anti-squat angle $θ_f$ is relatively small is adopted in consideration of ride comfort and nose dive feeling during braking, there is a problem that a sufficient effect of reducing the vertical displacement of the vehicle body cannot be achieved even if the non-cooperative process is executed.

In contrast, the present inventor has found that a high effect of reducing the vertical displacement of the vehicle body can be achieved even in the vehicle 100 equipped with the suspension structure having a relatively small anti-squat angle θ by adjusting net driving force distribution applied to the front wheels 11*f* and the rear wheels 11*r* beyond an adjustment range by the non-cooperative process using the front wheel braking force $B_f$ or the rear wheel braking force $B_r$.

Figure 3:
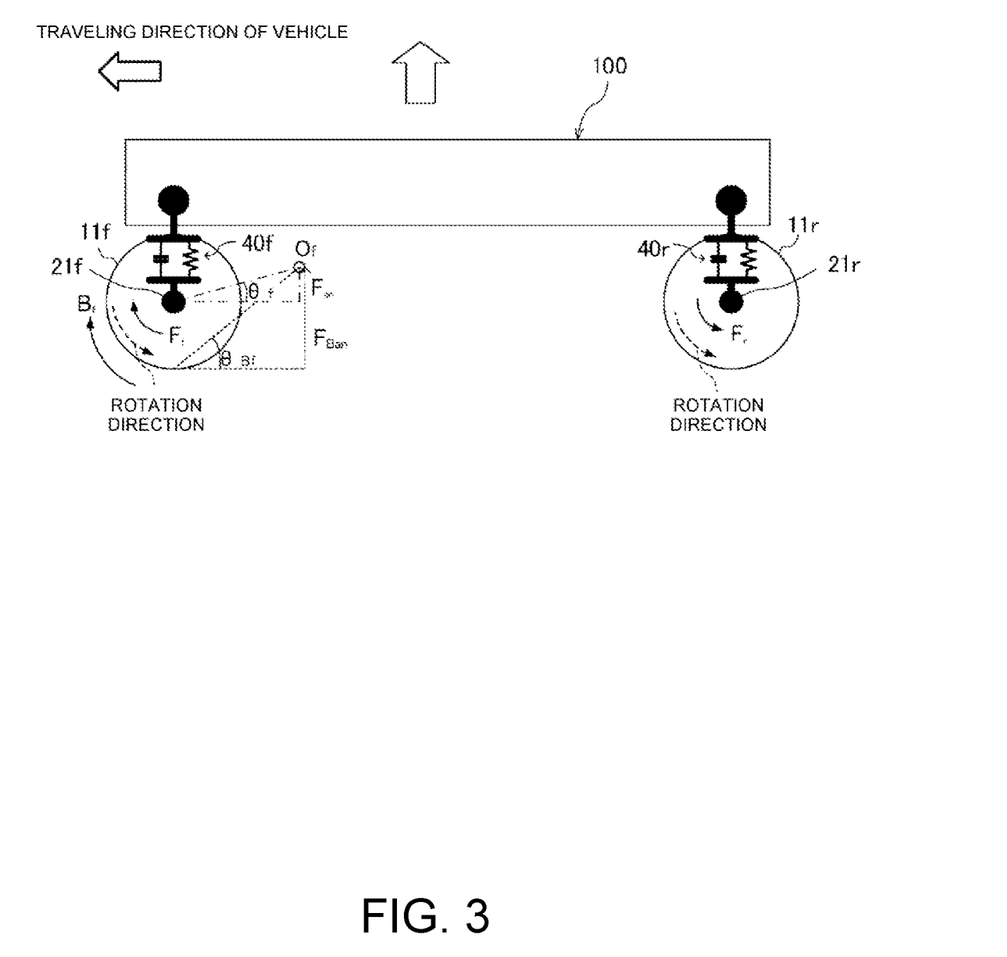
FIG. 3 is a diagram illustrating an operation and effect of executing a cooperative process.

FIG. 3 is a diagram illustrating an operation and effect of executing the cooperative process. In the following description, in particular, the operation and effect of the cooperative process will be described focusing on the first control mode (application of the front wheel braking force $B_f$, regenerative braking of the front wheels 11*f*, and power driving of the rear wheels 11*r*). On the other hand, the following description also applies to the second control mode (power driving of the front wheels 11*f*, application of the rear wheel braking force $B_r$, and regenerative braking of the rear wheels 11*r*).

As shown in the figure, when the first control mode is executed while the vehicle 100 is traveling forward, a working point of the front wheel braking force $B_f$ is an outer peripheral portion of the front wheel 11*f*. Therefore, an anti-squat angle $θ_{Bf}$ determined as an angle formed by a horizontal line and a straight line that connects the virtual rotation center $O_f$ on the front wheel side and the working point of the front wheel braking force $B_f$ to each other is larger than the anti-squat angle $θ_f$ in the non-cooperative process. Therefore, when the first control mode of the cooperative process is executed, the effect of reducing the vertical displacement of the vehicle body can be further enhanced compared to when the third control mode of the non-cooperative process is executed.

On the other hand, the cooperative process is control of operating the mechanical brake actuator 14. Therefore, in terms of control responsiveness, the non-cooperative process, which is electrical control without operation of a mechanical actuator, is superior.

Hereinafter, an example will be described in which, in a scene in which the vehicle 100 travels on an undulating road, a situation in which the reduction of the vertical displacement of the vehicle body is prioritized and a situation in which the control responsiveness is prioritized are distinguished according to the size of an unevenness of a traveling road surface, and one of the cooperative process and the non-cooperative process is appropriately executed.

Figure 4:
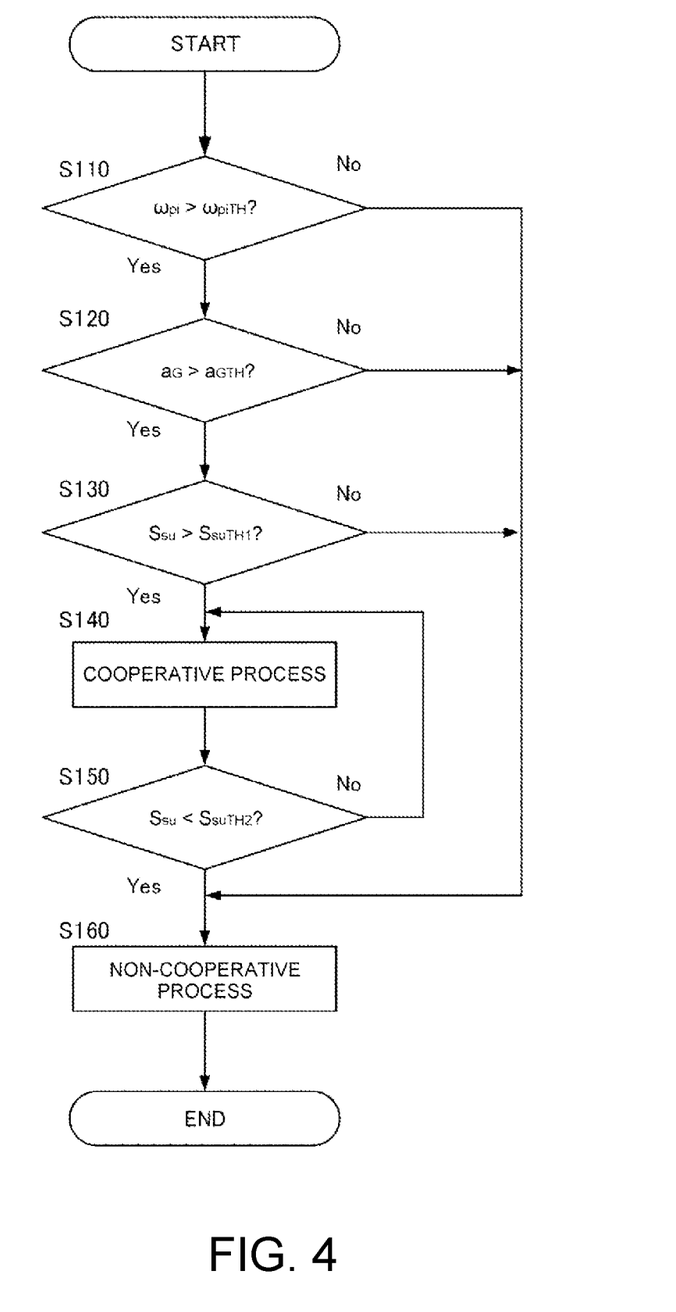
FIG. 4 is a flowchart illustrating a driving force control method according to the present embodiment.

FIG. 4 is a flowchart illustrating the driving force control method according to the present embodiment. Each process shown in FIG. 4 is executed based on a timing at which the controller 50 determines that the vehicle 100 is traveling on the undulating road based on information of a traveling road provided from a prescribed internal sensor or an external server mounted on the vehicle 100. In particular, the controller 50 repeatedly executes each process shown in FIG. 4 at prescribed calculation intervals in the scene.

In steps S110 and S120, the controller 50 determines whether a pitch rate $ω_{pi}$ and vertical acceleration $a_G$ exceed a pitch rate threshold value $ω_{piTH}$ and a vertical acceleration threshold value $a_{GTH}$, respectively.

Here, the pitch rate $ω_{pi}$ is a parameter defined as a time derivative (that is, a pitch angular velocity) of a pitch angle $θ_{pi}$. Further, the pitch angle $θ_{pi}$ is determined as a displacement angle in the pitch direction with respect to a horizontal direction around a center of gravity G of the vehicle 100 (see FIG. 2). A sign of the pitch angle $θ_{pi}$ is set such that a direction in which the front wheel 11*f* of the vehicle 100 is lifted up (nose up direction) is positive and a direction in which the rear wheel 11*r* is lifted up (nose down direction) is negative. Further, the vertical acceleration $a_G$ is acceleration in the vertical displacement of the vehicle 100 (center of gravity G of the vehicle 100). The pitch rate $ω_{pi}$, the pitch angle $θ_{pi}$, and the vertical acceleration $a_G$ can be calculated by a known method based on the detection values of the vertical acceleration sensors 30*f*L, 30*f*R on the front wheel side, the detection values of the vertical acceleration sensors 30*r*L, 30*r*R on the rear wheel side, and other necessary parameters.

Both the pitch rate $ω_{pi}$ and the vertical acceleration $a_G$ are parameters representing magnitude of the actual vertical displacement of the vehicle 100 during traveling on the undulating road. That is, both the pitch rate $ω_{pi}$ and the vertical acceleration $a_G$ are parameters (unevenness degree parameters) indicating the size of the unevenness of the undulating road.

Further, the pitch rate threshold value $ω_{piTH}$ and the vertical acceleration threshold value $a_{GTH}$ are determined as values to appropriately determine which of the effect of reducing the vertical displacement of the vehicle 100 and the high control responsiveness is prioritized. More specifically, the pitch rate threshold value $ω_{piTH}$ and the vertical acceleration threshold value $a_{GTH}$ are determined so that the cooperative process is executed when the unevenness of the undulating road is relatively large (when the high control responsiveness is not required, but the high effect of reducing the vertical displacement is required). Conversely, the pitch rate threshold value $ω_{piTH}$ and the vertical acceleration threshold value $a_{GTH}$ are determined such that the non-cooperative process is executed when the unevenness of the undulating road is relatively small (when the high control responsiveness is required, but the required effect of reducing the vertical displacement is small).

Further, the controller 50 executes a process of step S130 when both determination results of step S110 and step S120 are positive, and otherwise executes the non-cooperative process (step S160).

In step S130, the controller 50 determines whether the suspension stroke amount $S_{su}$ exceeds a first stroke amount threshold value $S_{suTH1}$.

Similarly to the pitch rate $\omega_{pi}$ and the vertical acceleration $a_G$, the suspension stroke amount $S_{su}$ is also an unevenness degree parameter representing the magnitude of the actual vertical displacement of the vehicle 100 during traveling on the undulating road. Further, the first stroke amount threshold value $S_{suTH1}$ is also set to a suitable value from the viewpoint of determining whether the unevenness of the undulating road is large to an extent that the reduction of the vertical displacement of the vehicle 100 by the cooperative process using the front wheel braking force $B_f$ or the rear wheel braking force $B_r$ is desired.

Further, when a determination result of step S130 is positive, the controller 50 executes the cooperative process (step S140), and otherwise, executes the non-cooperative process (step S160).

As a specific example of the cooperative process, the controller 50 executes the first control mode (lifts up the vehicle body) so as to cancel force in a lift down direction in a scene in which the vehicle 100 is traveling on a valley portion of the undulating road and the force in the lift down direction is generated on the vehicle body. On the other hand, the controller 50 executes the second control mode (lifts down the vehicle body) so as to cancel force in a lift up direction in a scene in which the vehicle 100 is traveling on the mountain of the undulating road and the force in the lift up direction is generated on the vehicle body.

Further, as an example of the non-cooperative process, the controller 50 executes the third control mode (lifts up the vehicle body) so as to cancel force in the lift down direction in a scene in which the vehicle 100 travels on the valley portion of the undulating road and the force in the lift down direction is generated on the vehicle body. On the other hand, the controller 50 executes the fourth control mode (lifts down the vehicle body) so as to cancel force in the lift up direction in a scene in which the vehicle 100 is traveling on the mountain of the undulating road and the force in the lift up direction is generated on the vehicle body.

An aspect of selection of the first control mode or the second control mode in the cooperative process and an aspect of selection of the third control mode or the fourth control mode in the non-cooperative process described above are examples, and the present invention is not limited thereto. Specific values of the front wheel driving force $F_f$, the rear wheel driving force $F_r$, the front wheel braking force $B_f$, and the rear wheel braking force $B_r$ set in the cooperative process or the non-cooperative process are not limited to specific values, and can be appropriately adjusted according to a situation.

Further, the controller 50 determines whether the suspension stroke amount $S_{su}$ falls below a second stroke amount threshold value $S_{suTH2}$ during the execution of the cooperative process (step S150).

The second stroke amount threshold value $S_{suTH2}$ is set to an appropriate value from the viewpoint of determining whether the unevenness of the undulating road is small enough to determine that it is necessary to switch from the cooperative process to the non-cooperative process in consideration of the control responsiveness.

Further, when the controller 50 determines that the suspension stroke amount $S_{su}$ falls below the second stroke amount threshold value $S_{suTH2}$, the controller 50 switches the control from the cooperative process to the non-cooperative process (step S160) and ends this routine.

In consideration of low control responsiveness in the above-described cooperative process, a configuration may be adopted in which the switching from the cooperative process to the non-cooperative process is executed when the suspension stroke amount $S_{su}$ falls below the second stroke amount threshold value $S_{suTH2}$ a plurality of times. In particular, it takes a certain amount of time until the effect of reducing the vertical displacement of the vehicle body is actually obtained after the cooperative process is started according to the determination result of step S130. In consideration of this, it is possible to prevent a situation where a state in which the suspension stroke amount $S_{su}$ is temporarily decreased is detected and the control is switched to the non-cooperative process even though the front wheel braking force $B_f$ or the rear wheel braking force $B_r$ has not yet followed the command immediately after a start of the cooperative process or the like. Further, in determination of step S150 (determination of whether to switch from the cooperative process to the non-cooperative process), a configuration may be adopted in which the pitch rate $\omega_{pi}$ and/or the vertical acceleration $a_G$ are appropriately compared with the threshold values.

Figure 5:
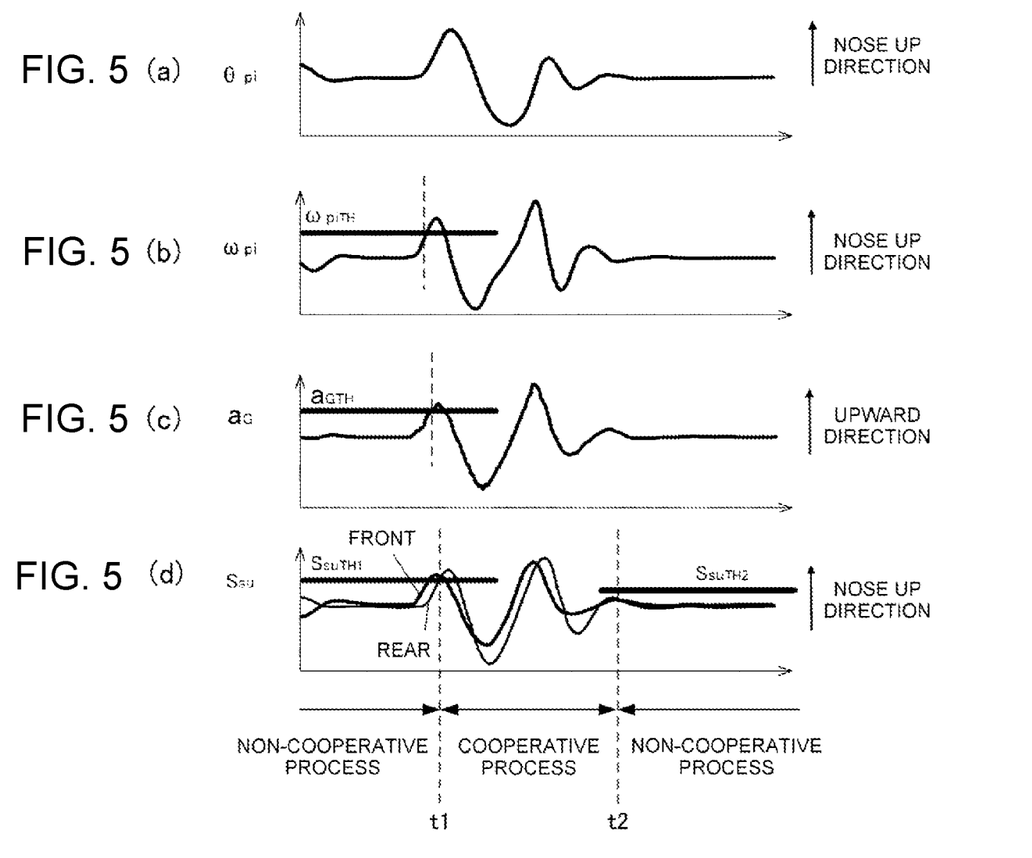
FIG. 5 shows timing charts showing examples of time-series changes of control parameters when control according to the present embodiment is executed in an undulating road traveling scene.

FIG. 5 shows timing charts showing examples of time-series changes of control parameters when the control according to the present embodiment is executed in an undulating road traveling scene. In the timing charts of FIG. 5, the pitch angle $\theta_{pi}$ and the pitch rate $\omega_{pi}$ are positive in the nose up direction of the vehicle 100, the vertical acceleration $a_G$ is positive in an upward direction with respect to the vehicle 100, and the suspension stroke amount $S_{su}$ is positive in a compression direction of the suspension 40.

As shown in the drawing, in a section (time t<t1) in which any one of the pitch rate $\omega_{pi}$, the vertical acceleration $a_G$, and the suspension stroke amount $S_{su}$ is equal to or less than a respective one of the threshold values, that is, in a scene in which the unevenness of the undulating road is estimated to be relatively small, the non-cooperative process is executed with priority given to the control responsiveness.

Further, when all of the pitch rate $\omega_{pi}$, the vertical acceleration $a_G$, and the suspension stroke amount $S_{su}$ (particularly, in FIG. 5, the suspension stroke amount $S_{su}$ on the rear wheel side) exceed the respective threshold values (time t=t1), that is, when the vehicle 100 is estimated to enter a section in which the unevenness of the undulating road is relatively large, the control is switched from the non-cooperative process to the cooperative process from the viewpoint of improving the effect of reducing the vertical displacement of the vehicle body.

Thereafter, when the suspension stroke amount $S_{su}$ (in FIG. 5, the suspension stroke amount $S_{su}$ on both the front wheel side and the rear wheel side) falls below the second stroke amount threshold value $S_{suTH2}$, that is, when the vehicle 100 is estimated to enter a section in which the unevenness of the undulating road is relatively small, the control is switched from the cooperative process to the non-cooperative process again.

Figure 6:
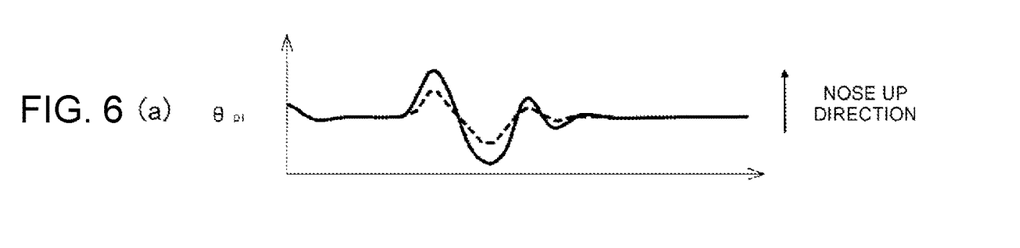
FIG. 6 shows diagrams illustrating an operation and effect.

FIG. 6 shows diagrams illustrating an operation and effect of executing the control described in the timing charts of FIG. 5. As shown in the figure, the pitch rate $\omega_{pi}$, the vertical acceleration $a_G$, and the suspension stroke amount $S_{su}$ (see broken lines), which are parameters indicating the magnitude of the vertical displacement in the control according to the present embodiment, are reduced compared to those (see solid lines) in a comparative example in which the basic drive control is maintained even during traveling on the undulating road.

Hereinafter, a configuration of the above-described present embodiment and an operation and effect thereof will be collectively described.

The present embodiment provides the driving force control method for controlling the front wheel driving force $F_f$ and the rear wheel driving force $F_r$ by the front wheel motor 10f connected to the front wheels 11f of the vehicle 100 and the rear wheel motor 10r connected to the rear wheels 11r, respectively.

In this driving force control method, the cooperative process (step S140) is executed in which the adjustment of at least one of the front wheel driving force $F_f$ and the rear wheel driving force $F_r$ and the application of the friction braking force (front wheel braking force $B_f$ or rear wheel braking force $B_r$) to at least one of the front wheel 11f and the rear wheel 11r cooperate to lift up or lift down the vehicle body.

Accordingly, it is possible to further improve the effect of reducing the vertical displacement (heave vibration) of the vehicle 100 compared to the case in which the vehicle body is lifted up or lifted down by control of adjusting only the front wheel driving force $F_f$ and the rear wheel driving force $F_r$.

In particular, the cooperative process (step S140) includes the first control mode in which the vehicle body is lifted up and the second control mode in which the vehicle body is lifted down. Further, in the first control mode, the friction braking force (front wheel braking force $B_f$) is applied to the front wheels 11f to power the rear wheel motor 10r. In the second control mode, the front wheel motor 10f is powered and the friction braking force (rear wheel braking force $B_r$) is applied to the rear wheel 11r.

Accordingly, when the vehicle 100 travels forward, a more specific control mode for lifting up or lifting down the vehicle body is achieved in the cooperative process.

The driving force control method according to the present embodiment further executes the non-cooperative process of lifting up or lifting down the vehicle body only by adjusting the front wheel driving force $F_f$ and the rear wheel driving force $F_r$ (step S160). Further, the non-cooperative process includes the third control mode in which the front wheel motor 10f is regenerated and the rear wheel motor 10r is powered, and the fourth control mode in which the front wheel motor 10f is powered and the rear wheel 11r is regenerated.

Accordingly, in accordance with the traveling scene of the vehicle 100 or the like, it is possible to execute the lifting up or the lifting down of the vehicle body by the non-cooperative process having the high control responsiveness instead of the cooperative process as appropriate. In this description, the term "only by the adjustment of the front wheel driving force $F_f$ and the rear wheel driving force $F_r$" means that the operation amount for the control of lifting up or lifting down the vehicle body includes the front wheel driving force $F_f$ and the rear wheel driving force $F_r$, but does not include the friction braking force. Therefore, the above term is not intended to exclude from the technical scope of the present invention a form in which control logic that uses an operation amount other than the friction braking force to assist in lifting up or lifting down the vehicle body is included in the non-cooperative process.

Furthermore, in the driving force control method according to the present embodiment, when the vehicle 100 is traveling on the undulating road, the unevenness degree parameters (pitch rate $\omega_{pi}$, vertical acceleration $a_G$, and suspension stroke amount $S_{su}$) indicating the size of the unevenness of the undulating road are obtained. Further, when the unevenness degree parameters exceed respective prescribed first threshold values (pitch rate threshold value $\omega_{piTH}$, vertical acceleration threshold value $a_{GTH}$, and/or first stroke amount threshold value $S_{suTH1}$) during the execution of the non-cooperative process, the non-cooperative process is switched to the cooperative process (steps S110 to S130 and S140).

Accordingly, it is possible to appropriately select the cooperative process having the effect of reducing the vertical displacement and the non-cooperative process in which the control responsiveness is high according to the size of the unevenness in the undulating road traveled by the vehicle 100.

In particular, in the present embodiment, when the unevenness degree parameter (particularly, the suspension stroke amount $S_{su}$) falls below a prescribed second threshold value (second stroke amount threshold value $S_{suTH2}$) during the execution of the cooperative process, the cooperative process is switched to the non-cooperative process.

Accordingly, it is possible to more appropriately select the cooperative process having the effect of reducing the vertical displacement and the non-cooperative process in which the control responsiveness is high according to the size of the unevenness in the undulating road traveled by the vehicle 100.

Further, in the present embodiment, the controller 50 that functions as the driving force control device that executes the driving force control method is provided. The controller 50 controls the front wheel driving force $F_f$ and the rear wheel driving force $F_r$ by the front wheel motor 10f connected to the front wheels 11f of the vehicle 100 and the rear wheel motor 10r connected to the rear wheels 11r, respectively.

In particular, the controller 50 includes a cooperative process unit (step S140) that causes the adjustment of the at least one of the front wheel driving force $F_f$ and the rear wheel driving force $F_r$ to cooperate with the application of the friction braking force (front wheel braking force $B_f$ or rear wheel braking force $B_r$) to the at least one of the front wheel 11f and the rear wheel 11r to lift up or lift down the vehicle body.

Accordingly, a configuration of the control device suitable for executing the driving force control method is achieved.

Although the embodiment of the present invention has been described above, the above embodiment is merely a part of application examples of the present invention, and does not intend to limit the technical scope of the present invention to the specific configurations of the above embodiment.

For example, in the above embodiment, the example has been described in which one of the non-cooperative process and the cooperative process is executed according to the size of the unevenness in the scene in which the vehicle 100 is traveling on the undulating road. However, the present invention is not limited thereto, and the same control can be executed in other traveling scenes in which the vertical displacement of the vehicle 100 is assumed to be reduced.

Furthermore, a specific aspect of the unevenness degree parameter is not limited to that described in the above embodiment. For example, information related to the unevenness of the undulating road may be acquired using a Lidar camera and/or any in-vehicle sensor such as a radar, and a value obtained by directly estimating the size of the unevenness from the information may be used as the unevenness degree parameter. Furthermore, parameters used for determining the switching from the non-cooperative process to the cooperative process are not limited to the unevenness degree parameters described above. For example, a configuration may be adopted in which a parameter indicating a length of a period of the mountain and valley of the unevenness of the undulating road is acquired based on information acquired from an in-vehicle server or an external server, and it is determined whether to switch from the non-cooperative process to the cooperative process based on the parameter.

In the above-described embodiment, the example has been described in which the adjustment (pitch adjustment) of the driving force distribution and the application of the friction braking force to the respective driving wheels cooperate with each other in both the first control mode (lift up control) and the second control mode (lift down control) of the cooperative process. However, the present invention is not limited thereto, and in the cooperative process, a control mode may be adopted in which the friction braking force is applied to only one of the first control mode and the second control mode. For example, a control mode may be adopted in which the front wheel braking force $B_f$ is applied in the first control mode (lift up control) of the cooperative process, but the rear wheel braking force $B_r$ is not applied in the second control mode (lift down control). As shown in FIG. 2, it is particularly preferable that the control logic is applied to a vehicle body structure in which, while the anti-squat angle $\theta_f$ on the front side is relatively small, the anti-squat angle $\theta_r$ on the rear side is relatively large, and a sufficient lift up and down amount can be ensured only by adjusting the driving force distribution on the rear side.

Further, in the above-described embodiment, the example has been described in which the control mode in which pitch displacement is adjusted by adjusting only the driving force distribution of the vehicle 100 is adopted as the non-cooperative process. However, instead of this, it is also possible to adopt a control mode in which the non-cooperative process is any driving force distribution (for example, the basic drive control that determines the driving force distribution during normal traveling) executed for purposes other than the purpose of adjusting the pitch displacement. For example, the technical scope of the present invention also includes a control mode in which the non-cooperative process is used as the basic drive control to achieve direct switching between the basic drive control and the cooperative process (switching without intervention of the pitch adjustment performed by the adjustment of the driving force distribution) as appropriate according to a situation of the traveling road surface such as the size of the unevenness of the undulating road.

The invention claimed is:

1. A driving force control method for controlling front wheel driving force and rear wheel driving force by a front wheel motor connected to a front wheel of a vehicle and a rear wheel motor connected to a rear wheel, respectively, the driving force control method comprising:
   acquiring a pitch rate, vertical acceleration, and a suspension stroke amount of the vehicle as an unevenness degree parameter indicating vertical displacement of the vehicle according to a size of an unevenness of a road surface on which the vehicle travels;
   determining a level of a request for reducing the vertical displacement with reference to the unevenness degree parameter; and
   switching between and executing a cooperative process and a non-cooperative process according to a determination result of the level of the request, wherein
   in the cooperative process, a vehicle body is lifted up or lifted down by cooperation of adjustment of at least one of the front wheel driving force and the rear wheel driving force and application of friction braking force to at least one of the front wheel and the rear wheel, and
   in the non-cooperative process, the vehicle body is lifted up or lifted down only by adjusting the front wheel driving force and the rear wheel driving force.

2. The driving force control method according to claim 1, wherein
   the cooperative process includes a first control mode in which the vehicle body is lifted up and a second control mode in which the vehicle body is lifted down,
   in the first control mode, the friction braking force is applied to the front wheel to power the rear wheel motor, and
   in the second control mode, the front wheel motor is powered, and the friction braking force is applied to the rear wheel or the rear wheel is regenerated.

3. The driving force control method according to claim 1, wherein the non-cooperative process includes a third control mode in which the front wheel motor is regenerated and the rear wheel motor is powered, and a fourth control mode in which the front wheel motor is powered and the rear wheel motor is regenerated.

4. The driving force control method according to claim 3, further comprising:
   when the vehicle is traveling on a road, acquiring the unevenness degree parameter, wherein
   during execution of the non-cooperative process, the non-cooperative process is switched to the cooperative process when the unevenness degree parameter exceeds a prescribed first threshold value.

5. The driving force control method according to claim 4, wherein during execution of the cooperative process, the cooperative process is switched to the non-cooperative process when the unevenness degree parameter falls below a prescribed second threshold value.

6. A driving force control device that controls front wheel driving force and rear wheel driving force by a front wheel motor connected to a front wheel of a vehicle and a rear wheel motor connected to a rear wheel, respectively, the driving force control device being configured to:
   acquire a pitch rate, vertical acceleration, and a suspension stroke amount of the vehicle as an unevenness degree parameter indicating vertical displacement of the vehicle according to a size of an unevenness of a road surface on which the vehicle travels;
   determine a level of a request for reducing the vertical displacement with reference to the unevenness degree parameter; and
   switch between and execute a cooperative process and a non-cooperative process according to a determination result of the level of the request, wherein
   in the cooperative process, a vehicle body is lifted up or lifted down by cooperation of adjustment of at least one of the front wheel driving force and the rear wheel driving force and application of friction braking force to at least one of the front wheel and the rear wheel, and in the non-cooperative process, the vehicle body is lifted up or lifted down only by adjusting the front wheel driving force and the rear wheel driving force.

\* \* \* \* \*